US011922266B2

United States Patent
Regard et al.

(10) Patent No.: US 11,922,266 B2
(45) Date of Patent: Mar. 5, 2024

(54) REMOTE BARCODES DECODING

(71) Applicant: Datalogic IP Tech S.r.l., Lippo di Calderara di Reno (IT)

(72) Inventors: Piero Fausto Paolo Regard, di Savena (IT); Pietro Masala, Modena (IT); Daniele Roppoli, Ciampino (IT); Davide Frascari, Persiceto (IT); Daniele Fiorini, Casalecchio di Reno (IT); Dimitri D'Annunzio, Zola Predosa (IT)

( * ) Notice: Subject to any disclaimer, the term of this patent is extended or adjusted under 35 U.S.C. 154(b) by 35 days.

(21) Appl. No.: 17/565,934

(22) Filed: Dec. 30, 2021

(65) Prior Publication Data

US 2023/0214615 A1 Jul. 6, 2023

(51) Int. Cl.
*G06K 7/10* (2006.01)
*G06K 7/14* (2006.01)
*H04W 76/10* (2018.01)

(52) U.S. Cl.
CPC .......... *G06K 7/1413* (2013.01); *H04W 76/10* (2018.02)

(58) Field of Classification Search
CPC ........... G06K 7/10722; G06K 7/10732; G06K 7/10881; G06K 7/1095; G06K 7/10544; G06K 7/10237; H04W 74/00; H04W 8/24; H04W 52/0209; G06Q 10/087
USPC ....................... 235/462.01, 462.46
See application file for complete search history.

(56) References Cited

U.S. PATENT DOCUMENTS

| | | | |
|---|---|---|---|
| 10,289,990 B2 | 5/2019 | Rizzolo et al. | |
| 2004/0206821 A1* | 10/2004 | Longacre, Jr. ... | G06K 19/06037 235/462.07 |
| 2005/0218218 A1* | 10/2005 | Koster .................... | G06F 3/147 235/383 |
| 2005/0258250 A1* | 11/2005 | Melick ................ | G06K 7/1095 235/462.46 |
| 2008/0077511 A1 | 3/2008 | Zimmerman | |
| 2008/0152263 A1* | 6/2008 | Harrison ................. | H04W 4/80 382/313 |
| 2008/0294766 A1* | 11/2008 | Wang ................ | H04W 52/0203 713/310 |
| 2014/0067426 A1* | 3/2014 | Neff ........................ | H04W 4/80 705/3 |

FOREIGN PATENT DOCUMENTS

CA          2792336          9/2011

* cited by examiner

*Primary Examiner* — Daniel St Cyr
(74) *Attorney, Agent, or Firm* — Shook, Hardy & Bacon L.L.P.

(57) ABSTRACT

Systems and method for remotely capturing a barcode and local decoding. The barcode may be captured using a remote imaging sensor. Images captured may be transmitted to a mobile scanner with an incorporated decoder. Additionally, inputs to the mobile scanner may facilitate moving the remote imaging sensor in three-dimensional space. Some embodiments also include a pointer device that may non-destructively mark a position for the remote imaging sensor to target. An image or series of image may be transmitted to the mobile scanner. When an image includes a barcode, the mobile scanner may decode the barcode and provide confirmation feedback.

20 Claims, 6 Drawing Sheets

REMOTE BARCODES DECODING

CROSS-REFERENCE TO RELATED APPLICATIONS

None.

BACKGROUND

Barcodes are present on many products to aid sales, inventory tracking, distribution logistics, and many other contexts. Generally, barcodes are optical machine-readable representations of data related to the product(s) to which it is attached. Normally, a scanner reads the barcode and a computer connected with the scanner identifies the product(s) and performs an action, which may vary based on situation. For example, in a sales context the computer may return a price; in an inventory tracking context the computer may add a value to a running count corresponding to the product(s); or, in a distribution logistics context, the product(s) location may be identified or the product(s) may be routed to a location for sorting.

However, traditional scanning systems have a limited reading range. In typical systems, the range is limited by the reader's resolution. As the range from the barcode increases, the ability for the reader to accurately resolve the machine-readable code diminishes. As a result, the labeled object may need to be brought within the scanner's read range or, the scanner needs to be carried to the labeled object. This may be problematic in a situations where the barcode labeled objects are difficult to move, unable to be moved, or moving a scanner is difficult. For example, where objects are in sterile rooms, clean rooms, or in hard to reach locations (e.g., stored on a shelf).

SUMMARY

Embodiments of the disclosure relate to system and methods of remote barcode reading. The reading system may read barcodes captured by remotely positioned optical sensors. In some embodiments, the remote optical sensor may be directed to a barcode via commands communicated from a decoding device. In some embodiments, the remote optical sensor may be directed to a barcode via a target beamed proximate the barcode. Once captured, one or more images may be transmitted from the remote optical sensor to the decoding device for decode.

In a first aspect, a system for a decoding remote barcodes is described including a barcode reader including a wireless communication transceiver, a processor, and non-transitory storage media. The processor and the non-transitory storage media may be inside a housing of the barcode reader. Additionally, in some aspects, the pointer device may be inside the housing of the barcode reader. The non-transitory storage media may store computer readable instructions that cause operations including establishing a wireless communication link with a remote image capturing system, transmitting action commands to the remote image capturing system via the wireless communication link, and decoding a barcode included in an image transmitted by the remote image capturing system.

In another aspect, a method for decoding remote barcodes is described. The method may include initializing a barcode reader. The method may also include establishing a wireless communication link between the barcode reader and a remote image capturing system. Additionally, the method may include transmitting commands to the remote image capturing system via the wireless communication link that are generated in response to a signal output from a sensor of the barcode reader and decoding a barcode included in an image transmitted by the remote image capturing system.

Another aspect non-transitory storage media is described that if executed by a group of processors cause a system to establish a wireless communication link with a remote image capturing system. The system may also transmit commands to the remote image capturing system via the wireless communication link that are generated in response to a signal output from a sensor of the system and decode a barcode included in an image transmitted by the remote image capturing system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is illustrated by way of example and not limitation in the accompanying figures in which like reference numerals indicate similar elements and in which.

DETAILED DESCRIPTION

Embodiments of the present disclosure involve decoding barcodes in an image transmitted from a remote sensor. The remote sensor may include a camera that may be controllable via the decoding device. Images captured by remote sensor may be transmitted to the decoding device (e.g., a mobile barcode scanner). Barcodes within the image may be decoded and confirmation feedback may be generated. The feedback may include visual, audio, or haptic signals that indicate successful or unsuccessful decoding of a barcode. Some embodiments also include a pointer device that may emit a beam of light in a pattern. The pattern may be detected and used to position the remote sensor such that the images include the pattern and a barcode.

In contrast to traditional systems and method, the embodiments described herein are not limited to the read range of a scanner built into the decoding device. The images may be captured by a remote sensor with optical or digital zoom features that may facilitate long range image capturing with a resolution high enough to enable accurate and reliable decoding of machine-readable code. Additionally, the systems and methods described herein may facilitate capture of barcodes in locations that a mobile barcode scanner may not be permitted or where a user may not have access.

Figure 1:
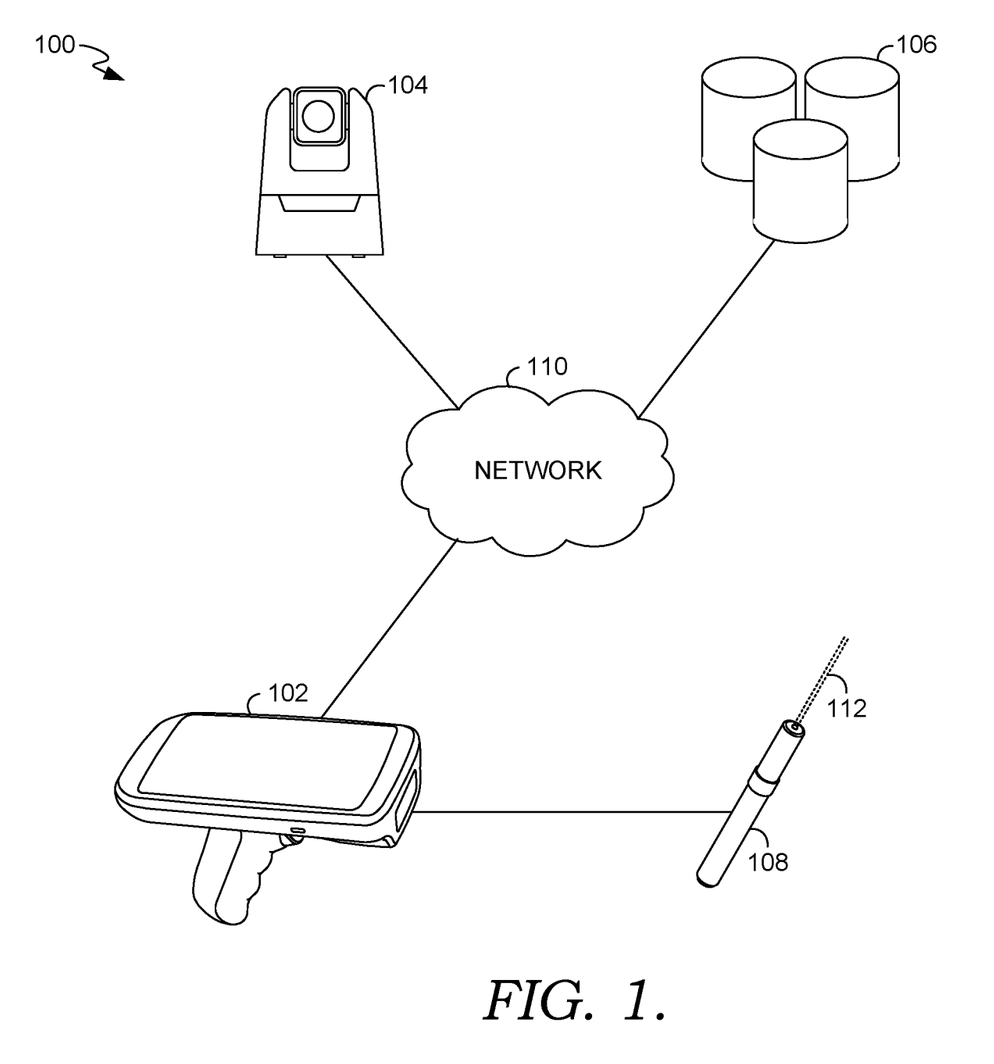
FIG. 1 is an example system environment including a mobile computing scanner, a remote sensor, and a pointer, in accordance with an embodiment of the present disclosure.

Turning to FIG. 1, an example system environment 100 is depicted for remote barcode decoding, in accordance with some aspects described herein. It should be understood that this and other arrangements described herein are set forth only as examples. Exemplary environments may include areas with hard to reach locations (e.g., where items are stored on a shelf) such as warehouses, retail locations, etc. Other environments may include areas where it may be desirable for limited access by users or mobile devices, such as sterile rooms or clean rooms in hospitals, laboratories, or other similar environments. At a high level, system environment 100 may facilitate the acquisition of one or more images containing a barcode using one or more remote sensors (e.g., remote sensor 104). The images may be communicated through a network (e.g., network 110) and decoded by a mobile computing scanner device (e.g., mobile computing scanner device 102).

Figure 2:
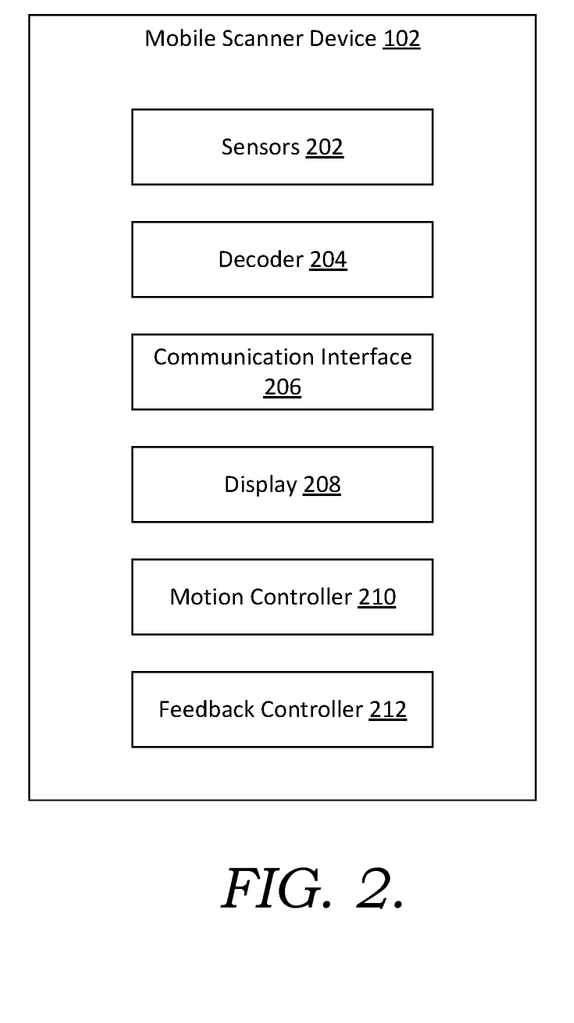
FIG. 2 is an example block diagram of a mobile computing scanner, in accordance with an embodiment of the present disclosure.

The system environment 100 includes a mobile computing scanner device 102, one or more remote sensors 104, a remote sever 106, and network 110. Generally, the mobile computing scanner device 102 decodes barcodes that are locally or remotely scanned. To facilitate this, mobile computing scanner device 102 may include one or more hardware components, software components, firmware components, or any combination thereof. For example, as depicted in FIG. 2, mobile computing scanner device 102 may include one or more sensors 202, a decoder 204, communication interface 206, display 208, and motion controller 210. Sensor(s) 202 may include input sensors such as image capturing sensor(s) (e.g., a camera), one or more buttons (e.g., a keyboard or a trigger), one or more accelerometers, one or more gyroscopes, one or more magnetometers, or any combination thereof. Sensor(s) 202 may also include output sensors such as one or more single wavelength LEDs, one or more multi-wavelength LEDs, one or more haptic sensors (e.g., eccentric rotating mass actuator), one or more speakers, or any combination thereof.

Decoder 204 may extract data from one or more images received by, or captured by, the mobile scanner device 102. For example, decoder 204 may identify elements of a barcode within an image and convert the visual representation into a corresponding set of machine-readable data. The decoder may identify and capture optical codes, such as two-dimensional codes (e.g., Quick Response (QR) codes), one-dimensional bar codes, as well as high density codes, Dot codes, watermarking (e.g., Digimarc), optical code recognition (OCR), or any other optically based machine readable code within one or more images. For example, the decoder 204 may extract pixel data from the array of pixels within the image and analyze the data. The decoder 204 may be preprogramed with a one or more decoding libraries providing machine readable instructions for decoder 204 to compute the decoded barcode from the pixel data. Additionally, in at least one embodiment, decoder 204 may include a pointer library providing machine readable instructions for identification of a pointer pattern (e.g., a pattern emitted by pointer device 108).

Communication interface 206 may manage the receipt and transmission of data for the mobile scanner device 102. For example, the communication interface 206 may establish wireless communication channels with one or more remote sensors 104, remote server 106, pointer device 108, or any combination thereof via a radio (e.g., radio 624 of FIG. 6). The wireless communication channels may be direct path connections (e.g., without intermediary routing) or indirect path connections (e.g., including one or more intermediary routing device).

Display 208 may be any display suitable for visual presentation of images based on machine-readable instructions. For example, display 208 may be a liquid crystal display (LCD), light emitting diode (LED) display, organic LED (OLED) display, or any other display. In some embodiments, display 208 may also include touch-based interactivity. For example, display 208 may include a resistive or capacitive touch panel, or any other suitable panel. Although described in relation to display 208, a panel that facilitates touch-based interactivity may also be considered an input sensor (e.g., sensor 202).

Generally, motion controller 210 converts signals generated by one or more sensors 202 into machine-readable instructions for changing the position of one or more remote sensors 104. The signals may be converted into instructions for movement of the one or more remote sensors 104 in one or more degrees of freedom. In an embodiment, the instructions may cause the remote sensors to change pitch, yaw, or roll corresponding to the signals generated by one or more sensors of the mobile computing scanner device 102. For example, changing the pitch of the mobile computing scanner device 102 may generate instructions that change the pitch of the remote sensor 104 in a corresponding rotational direction. Similarly, in some embodiments the instructions may cause a remote sensor to move on a track or system of tracks to change positions in a room. In some embodiments, the signals may be converted into instructions for changing an imaging property of the one or more remote sensors 104. For example, the imaging properties may include zoom, focus, aperture, exposure, and so forth. Additionally, or alternatively, motion controller 210 may include one or more physical buttons, or interface elements (e.g., presented for display on display 208), that are associated with movement and/or imaging properties of a remote sensor.

In at least one embodiment including a display 208 with touch-based interactivity, motion controller 210 may convert touch gestures into instructions for changing an imaging property or movement of the one or more remote sensors 104. Thus, user's may control operations of the remove sensors 104 via inputs to the mobile computing scanner device 102. For example, a pinch gesture by the user may correspond with zoom in or zoom out commands for the remote sensors 104. A drag gesture by the user in a direction may correspond with translational movement for the remote sensors 104 in a corresponding direction. A rotational gesture by the user may correspond with a rotational movement for the remote sensors 104.

Additionally, in some embodiments motion controller 210 may maintain a scan library of that stores rules for locating a light pattern (e.g., a pattern emitted by pointer device 108). The rules may include predetermined image property commands, motion commands, or a combination of both. Further, the rules may include "if", "then" statements or other operational commands that facilitate rapid acquisition of a light pattern. For example, the rules may generate an initial set of commands to change the zoom of the remote sensor 104 to its widest field of view. The rules may then task another component of mobile computing scanner device 102 with sampling image data from the remote sensor 104 to localize one or more pixels based on the pixel data. For example, where the pattern includes a particular wavelength of light, the rules may identify a range of RGB values that are representative of the wavelength. If detected within the pixel data of the image, the rules may identify a set of commands that may position the remote sensor 104 such that the RGB values occur in the center most pixels of the image. The rules may further include commands that zoom in a predetermined distance while adjusting the position of the remote sensor 104 to maintain the RGB values in the center most pixels of the images received from remote sensor 104. Those skilled in the art will understand that the rule library may contain similar rules for other light patterns (e.g., those described in relation to pointer device 108).

In at least one embodiment, the instructions may include an incremental magnitude. For example, changing the pitch of the mobile computing scanner device 102 beyond a threshold may generate instructions to change the pitch of the remote sensor 104 in a corresponding rotational direction in a predetermined amount. Alternatively, the instructions may be a continuous command corresponding with the input signals. Said another way, a change in pitch of the mobile computing scanner device 102 may be converted into a command to change the pitch of the remote sensor until the mobile computing scanner device 102 is returned to a neutral position.

Some embodiments of mobile computing scanner device 102 may also include feedback controller 212. Feedback controller 212 may generate human perceivable outputs in response to the result of the computational operations of other components of mobile computing scanner device 102. The outputs of feedback controller 212 may be facilitated by transmitting signals that activate one or more sensors (e.g., sensor(s) 202). In an embodiment, feedback controller 212 may generate a first set of signals in response to decoder 204 successfully decoding a barcode. Additionally, or alternatively, feedback controller 212 may generate a second set of signals in response to decoder 204 unsuccessfully decoding a barcode. In at least one embodiment, the first set of signals and the second set of signals cause the one or more sensors to activate in different ways. For example, feedback controller 212 may activate an LED, a haptic feedback sensor, or a speaker. In response to successfully decoding the barcode, a green LED may be activated, a short duration haptic pulse may be activated, a tone in a major key may be emitted, or any combination thereof. In response to unsuccessfully decoding the barcode, a red LED may be activated, a long duration haptic pulse may be activated, a tone in a minor key may be emitted, or any combination thereof. As will be understood by those skilled in the art, these are merely examples and it is contemplated that the human perceivable outputs may be any action suitable for human perception. Some embodiments of mobile computing scanner device 102 may also include one or more components of computing system 600 of FIG. 6 in some embodiments.

A remote sensor 104 generally facilitates capture of one or more barcodes. The barcodes may be captured in image data (e.g., at least one image) and transmitted via a network to scanner (e.g., a mobile computing scanner device 102). To facilitate this remote sensor 104 may include one or more optical imaging sensors, such as a charge-coupled device (CCD), a complementary metal-oxide-semiconductor (also referred to as a complementary-symmetry metal-oxide-semiconductor) (CMOS). Remote sensor 104 may also include one or more lenses. Preferably, at least one of the lens is a variable focal length (e.g., a lens with a zoom range). However, the lens may be a fixed focal length in some embodiments. Additionally, in some embodiments, the remote sensor 104 may include one or more motors configured to facilitate rotational movement of the lens. In some embodiments, the remote sensors 104 may be positioned in one or more translationally fixed positions. Alternatively, a remote sensor 104 may be mounted to an armature or rail that are configured to facilitate translational movement of a remote sensor 104. The armature or rail may be of any configuration suitable for the environment. For example, in a warehouse a rail or group of rails may be configured to facilitate vertical movement of a remote sensor 104 from a lowest point where barcode labeled objects are positioned to a highest point where barcode labeled objects may be stored. Additionally, or alternatively, the rails may be configured to facilitate horizontal movement of the remote sensor 104 from a first column where barcode labeled objects may be positioned to a last column where barcode labeled objects may be positioned. In other environments, it may be preferable an armature with one or more degrees of freedom may be used.

Additionally, remote sensor 104 includes a radio configured for bidirectional communication using one or more wireless communication protocol (e.g., Wi-Fi 802.11 protocols, Bluetooth, ZigBee, 3G, 4G, or 5G). Remote sensor 104 may also include one or more components of computing system 600 of FIG. 6 in some embodiments.

System environment 100 also includes server(s) 106. Components of the server 106 may include, without limitation, a processing unit, internal system memory, and a suitable system bus for coupling various system components with the server 106. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Generally, server 106 facilitates storage or use of barcode data decoded by mobile computing scanner device 102. For example, server 106 may include one or more applications that facilitate inventory management or logistics (e.g., purchasing, ordering, or distribution). Additionally, server 106 may include one or more databases configured to store decoded barcode data or other contextually relevant data (e.g., time stamps, location, identification of a scanner associated with the entry, and so forth). In some embodiments, server 106 may include one or more object database libraries. For example, the data base libraries may include relational databases maintaining data maps associating an object with barcode data.

Network 110 facilitates communication between a mobile computing scanner device 102, one or more remote sensor 104, one or more servers 106, and any other remote device that may be configured to communicate with mobile computing scanner device 102. Network 110 may include, without limitation, local area networks (LANs) and/or wide area networks (WANs). Such networking environments are commonplace in offices, enterprise-wide computer networks, intranets, and the Internet. In an embodiment, network 110 includes one or more devices configured to facilitate wireless communication between at least two other devices. For example, network 110 may include bidirectional wireless communication channels facilitated by Wi-Fi (e.g., 802.11 protocol), Bluetooth, ZigBee, 5G, or any other wireless communication protocol.

Some embodiments of system environment 100 also includes pointer device 108. Pointer device 108 generally facilitates light-based object marking. The pointer device 108 may be integrated (e.g., embedded) with mobile computing scanner device 102 in some embodiments. Alternatively, the pointer device 108 may be an independent (e.g., standalone) device. The pointer device 108 may mark an object (e.g., object 406 of FIG. 4) with a pattern (e.g., pattern 408 of FIG. 4) of light 112 emitted from the pointer device. In some embodiments, pattern 408 may be a shape (e.g., circle, square, triangle, or any other two dimensional Euclidian shape), a design (e.g., a two dimensional symbol, arrangement of symbols, or arrangement of shapes), a color (e.g., a wavelength of light detectable by remote sensor 104), a series of pulses (e.g., a defined set of on and off cycles), a cycle of colors, or any combination thereof. Additionally, the light 112 emitted by pointer device 108 may have a range that extends beyond the read range (e.g., range 310 of FIG. 4) of the mobile computing scanner device 102. To facilitate this, pointer device 108 includes one or more light sources (e.g., a laser, light emitting diode) and a power supply.

Figure 4:
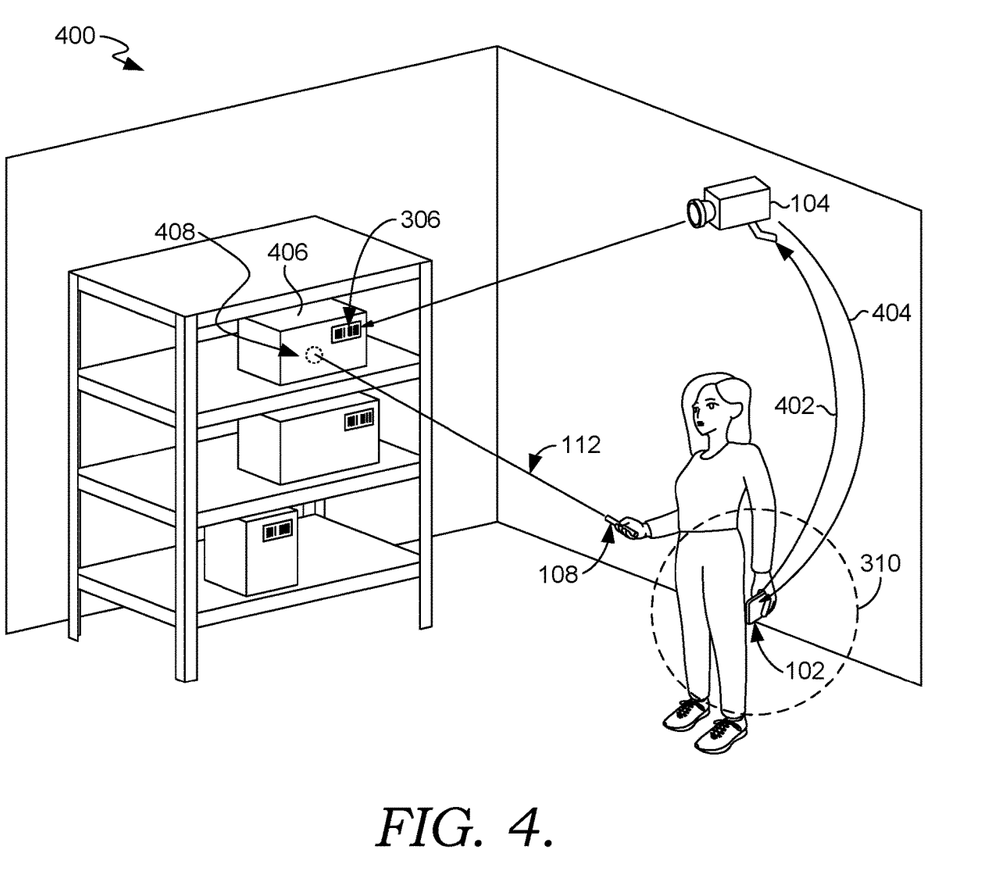
FIG. 4 is another example environment including a mobile computing scanner, pointer, and remote sensor, in accordance with an embodiment of the present disclosure.

Additionally, in some embodiments pointer device 108 communicate data corresponding to the pattern to mobile computing scanner device 102. For example, pointer device 108 may wirelessly connect with, or otherwise pair with, mobile computing scanner device 102. Once paired, pointer device 108 may transmit identification of its pattern 408 to mobile computing scanner device 102. To facilitate this, pointer device 108 may include one or more components of computing system 600 of FIG. 6.

Figure 3:
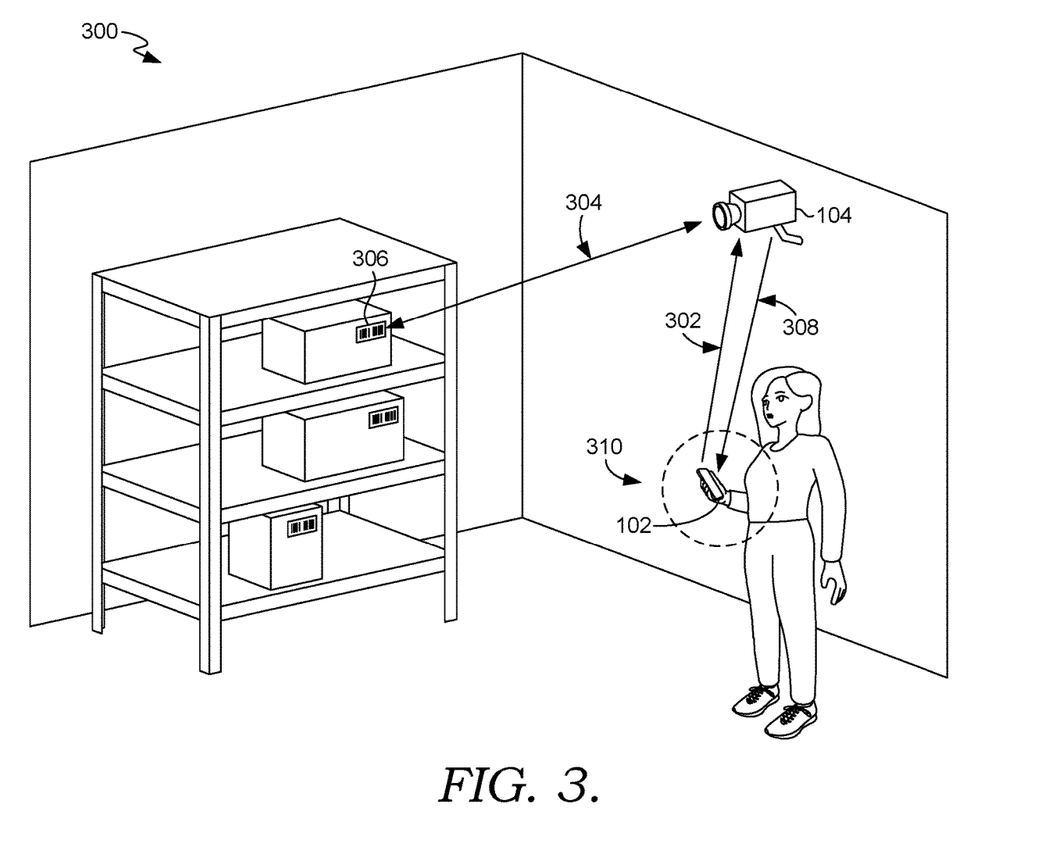
FIG. 3 is an example environment including a mobile computing scanner and a remote sensor, in accordance with an embodiment of the present disclosure.

With general reference to FIGS. 3 and 4, environments 300 and 400 are depicted, in accordance with some of the embodiments described herein. The depicted environments are intended merely to facilitate the clear description of some of the embodiments described and are not limiting. For example, it is contemplated that the user of mobile computing scanner device 102 may be separated by one or more barriers (e.g., walls) from the objects and remote sensors. Further, it is contemplated that some embodiments described herein may be implemented in environments were direct user access or access with a mobile computing scanner device 102 is limited, restricted, or prohibited. For example, embodiments described herein may be used in evidence holding areas, operating rooms, clean rooms, hazardous material storage areas, and so forth.

FIG. 3 depicts an example environment 300, in accordance with some aspects described herein. Environment 300 is described, by way of example, with respect to system 100 of FIG. 1 and the example mobile computing scanner device 102 of FIG. 2. As depicted, environment 300 includes a mobile computing scanner device 102 with a local sensor read range 310. Local sensor read range 310 may be limited to a volume of space that is determined based on the resolution of an optical sensor within the housing of mobile computing scanner device 102. Said another way, in some embodiments barcodes beyond local sensor read range 310 may not be accurately decodable. For example, the pixels of an image captured by a local sensor may not be sufficiently dense to distinguish the machine-readable code of a barcode 306. Although a user may change positions of the mobile computing scanner device 102, the barcode 306 may be located such that the user cannot position barcode 306 within the read range 310. Accordingly, in some embodiments the mobile computing scanner device 102 may be initialized into a pairing mode that establishes a wireless communication link with remote sensor 104. For example, based on inputs from one or more sensors 202 the communication interface 206 may search a wireless network 110 for remote sensor 104.

Once the communication link is established, image data captured by remote sensor 104 may be transmitted 308 to mobile computing scanner device 102. In an embodiment, the image data may be displayed by display 208 of mobile computing scanner device 102. In response to input signals generated by one or more sensors 202, motion controller 210 may generate machine understandable commands to change the position of remote sensor 104. Communication interface 206 may transmit 302 the commands to the remote sensor 104. For example, the initial position and orientation of remote sensor 104 may result in the capture of image data that does not include barcode 306. A user may interact with mobile computing scanner device 102 to reposition or reorient the remote sensor 104 such that at least a portion of barcode 306 is within the image data capture by remote sensor 104. In other words, inputs to mobile computing scanner device 102 may be converted into commands that align the remote sensor 104 along an optical path 304.

Additionally, or alternatively, in response to input signals generated by one or more sensors 202, motion controller 210 may generate machine understandable commands to change an imaging property of the remote sensor 104. For example, the lens of remote sensor 104 may zoomed in (e.g., a narrow field of view) such that the captured image does not include all of barcode 306. Similarly, the lens of remote sensor 104 may be zoomed out (e.g., a wide field of view) such that decoder 204 cannot resolve the machine-readable data encoded in barcode 306. Accordingly, a user may interact with mobile computing scanner 102 to change the imaging properties of the remote sensor 104 such that barcode 306 is readably within the image data captured by remote sensor 104.

In some embodiments, remote sensor 104 may continuously or periodically transmit image data to mobile computing scanner 102 while the user is adjusting one or more imaging properties (e.g., field of view) of the remote sensor 104. When one or more images that include barcode 306 are received by the mobile computing scanner 102, its decoder 204 may attempt to decode the barcode 306. This decoding may be an automatic or real-time process that occurs while the user is positioning or otherwise in control of the remote sensor 104.

In some embodiments, the decoder 204 may be triggered to attempt a decode of the barcode 306 in response to a predefined input (e.g., button press). As a result, the user may operate the mobile computing scanner 102 to adjust the one or more image properties of the remote sensor 104 to achieve the desired view or position, after which the user may trigger an input (e.g., manual, audio, etc.) that triggers the decoder 204 to attempt a decode of that current image. Upon successfully decoding barcode 306, decoder 204 may trigger feedback controller 212 to activate a positive read response. Upon an unsuccessful decode attempt of barcode 306, decoder 204 may trigger feedback controller 212 to activate a negative read response. The user may adjust the image properties in response to the feedback in order to achieve a better result.

FIG. 4 depicts an example environment 400 including a pointing device, in accordance with some aspects described herein. Environment 400 is described, by way of example, with respect to system 100 of FIG. 1 and the example mobile computing scanner device 102 of FIG. 2. As depicted, environment 400 includes a mobile computing scanner device 102 and pointer device 108. As described above, although a user may change positions of the mobile computing scanner device 102, the barcode 306 may be located such that the user cannot position barcode 306 within the local read range 310. In some embodiments, the mobile computing scanner device 102 may establish a wireless communication link with remote sensor 104.

Similarly, in some embodiments, the mobile computing scanner device 102 may be initialized into a pairing mode that establishes a wireless communication link with pointer device 108. The pairing mode may be the same or different from the pairing mode that facilitated the link between mobile computing scanner device 102 and remote sensor 104. For example, the wireless communication link (e.g., 402 and 404) between mobile computing scanner device 102 and remote sensor 104 may be based on a Wi-Fi protocol while the wireless communication link between mobile computing scanner device 102 and pointer device 108 may be based on a Bluetooth protocol. Once the communication link between mobile computing scanner device 102 and pointer device 108 is established, pointer device 108 may communicate the pointer's pattern or a pattern identifier to mobile computing scanner device 102.

The light source of pointer device 108 may be activated to emit light beam 112 and directed to a surface of object 406, or a surface of the environment 400, near barcode 306. The light beam 112 may non-destructively mark object 406 with pattern 408. The mobile computing scanner device 102 and/or the remote sensor 104 may recognize the light beam 112 and automatically adjust the image properties (e.g., field of view) of the remote sensor 104 to focus on the area around the light beam 112. Thus, the user may direct the light beam 112 to indicate the desired object or barcode to be within the captured images, and the remote sensor 104 may adjust accordingly to ensure than the area is within the captured images by zooming or otherwise controlling the positioning of the remote sensor 104.

As an example, a pattern search may be started for the pattern 408 based on input to the mobile computing scanner device 102. For example, motion controller 210 may execute one or more rules stored in a scan library and transmit 402 commands to remote sensor 104 until the image data captured by the remote sensor 104 includes the pattern 408 and barcode 306. When one or more images transmitted 404 by remote sensor 104 includes pattern 408 and barcode 306, decoder 204 may attempt to decode the barcode 306. Alternatively, decoder 204 may be triggered to attempt a decode of the barcode 306 in response to a predefined input, such as a button press. Upon successfully decoding barcode 306, decoder 204 may trigger feedback controller 212 to activate a positive read response. If the decode attempt is unsuccessful, decoder 204 may trigger feedback controller 212 to activate a negative read response.

Figure 5:
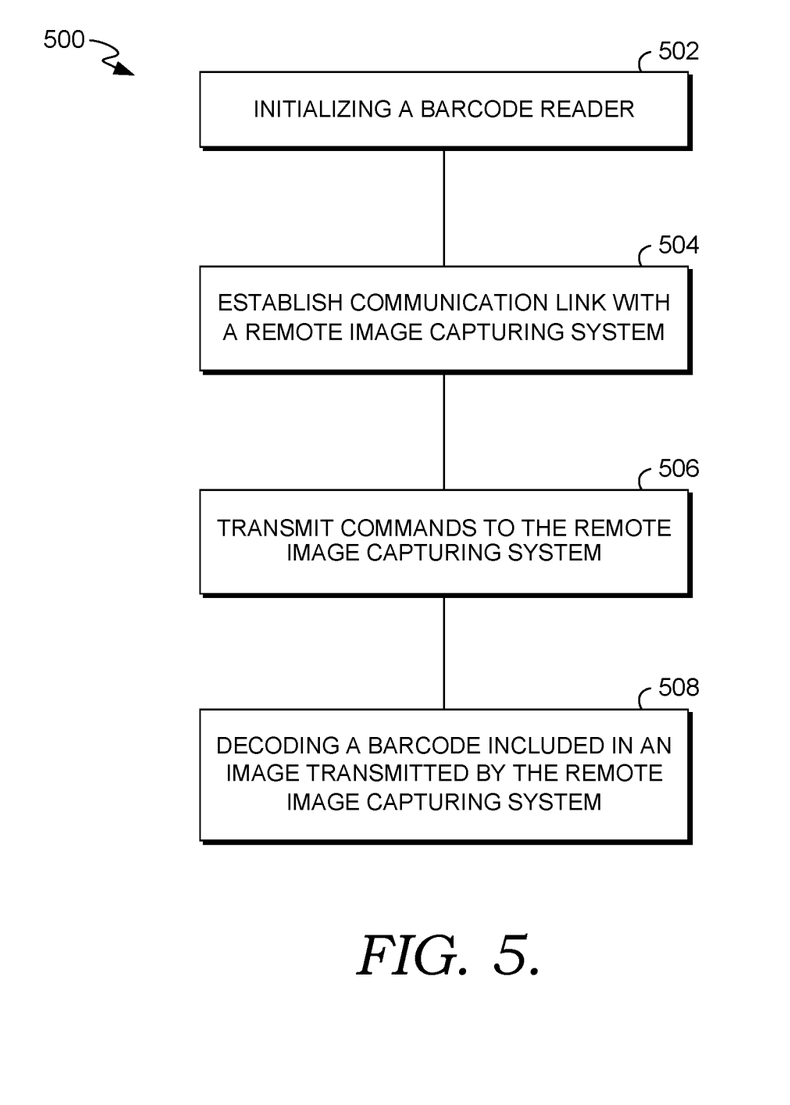
FIG. 5 is an example method for the remote capture and local decoding of a barcode, in accordance with an embodiment of the present disclosure.

FIG. 5 depicts a method 500 for remote decoding of a barcode, in accordance with aspects described herein. Each block of method 500, described herein, comprises a computing process that may be facilitated by hardware, firmware, software, or any combination thereof. For instance, various functions may be carried out by a processor executing instructions stored in memory. In addition, method 500 is described, by way of example, with respect to system 100 of FIG. 1 and the example mobile computing scanner device 102 of FIG. 2. However, this method may additionally or alternatively be executed by any one system, or any combination of systems, including, but not limited to, those described herein.

Method 500, at block 502, includes initializing a barcode reader. For example, initialization may include powering on the mobile computing scanner device 102. In some embodiments, initialization may include triggering searching for remote sensor 104, pointer device 108, or the combination.

Method 500, at block 504, includes establishing a communication link with a remote image capturing system. For example, mobile computing scanner device 102 may connect with a remote sensor 104 via a wireless communication channel facilitated by network 110.

Method 500, at block 506, includes transmitting commands to the remote image capturing system. For example, a motion controller 210 may convert sensor inputs of mobile computing scanner device 102 to movement commands or image capturing properties for remote sensor 104.

Method 500, at block 508, includes decoding a barcode included in an image transmitted by the remote image capturing system. For example, when image data transmitted by remote sensor 104 includes a barcode (e.g., barcode 306 of FIG. 3 or 4), decoder 204 of mobile computing scanner device 102 may decode the barcode.

Figure 6:
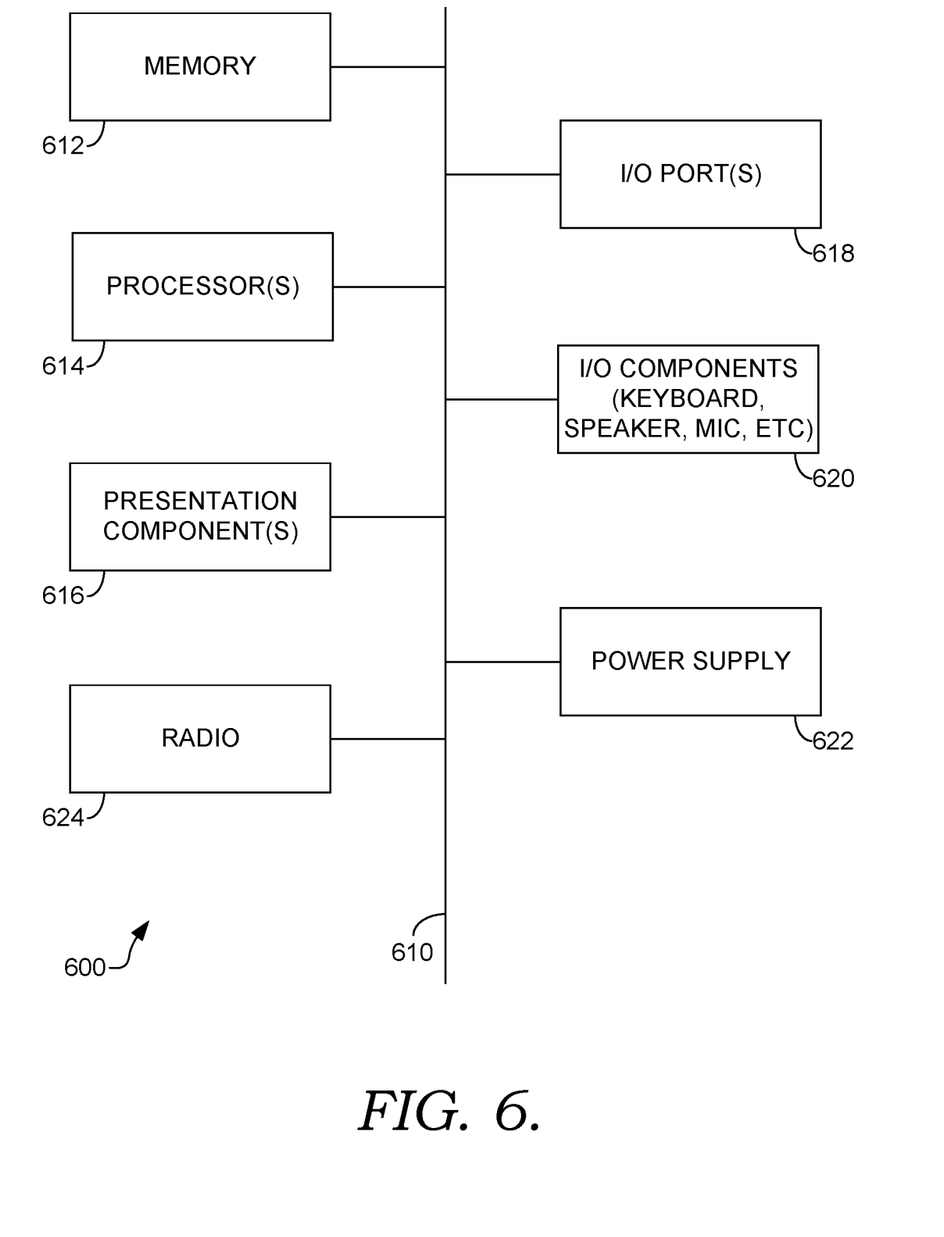
FIG. 6 is an example computing device, in accordance with an embodiment of the present disclosure.

Turning to FIG. 6, computing device 600 includes bus 610 that directly or indirectly couples the following devices: memory 612, one or more processors 614, one or more presentation components 616, input/output (I/O) ports 618, I/O components 620, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. In addition, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 presents data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, camera, joystick, game pad, satellite dish, scanner, printer, wireless device, etc.

Radio 624 represents a radio that facilitates communication with a wireless telecommunications network. In aspects, the radio 624 utilizes one or more transmitters, receivers, and antennas to communicate with the wireless telecommunications network on a first downlink/uplink channel. Though only one radio is depicted in FIG. 6, it is expressly conceived that the computing device 600 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 624 might additionally or alternatively facilitate other types of wireless communications including Wi-Fi, Bluetooth, ZigBee, WiMAX, LTE, and the like. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the disclosure. Components such as a base station, a communications tower, or even access points (as well as other components) can provide wireless connectivity in some embodiments.

The foregoing descriptions of the embodiments of the disclosure are illustrative, and modifications in configuration and implementation will occur to persons skilled in the art. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

What is claimed is:

1. A system for a decoding remote barcodes, comprising:
   a barcode reader including an image capturing sensor, a wireless communication transceiver, a processor, and non-transitory storage media, wherein the image capturing sensor, the processor, and the non-transitory storage media are disposed inside a housing of the barcode reader;
   the non-transitory storage media storing computer readable instructions that cause the processor to perform operations including:
      capture local images via the image capturing sensor and decode a barcode included in the local images via a decoder within the barcode reader;
      establish a wireless communication link with between the barcode reader and a remote image capturing system to transmit action commands to the remote image capturing system and to receive remotely captured images from the remote image capturing system via the wireless communication link, wherein the action commands transmitted by the barcode reader to the remote image capturing system include instructions that cause the remote image capturing system to adjust its movement and/or imaging properties responsive to inputs by a user of the barcode reader; and
      decode, via the decoder within the barcode reader, a barcode included in a remotely captured image received from the remote image capturing system.

2. The system of claim 1, wherein the barcode reader further includes a motion sensor that outputs signals in response to translation of the barcode reader, and wherein the operations of processor of the barcode reader include converting the output signals of the motion sensor into the action commands that are transmitted to control movement of the remote image capturing system.

3. The system of claim 1, further comprising a pointer device including a light source configured to emit a light pattern that extends beyond a read range for the barcode reader and within the field of view of the remote image capturing system.

4. The system of claim 3, wherein the barcode is decoded in response to the barcode reader detecting the light pattern within the remotely captured image received from the remote image capturing system.

5. The system of claim 4, wherein the decoder within the barcode reader includes a pointer library providing machine readable instructions for detecting the light pattern within the remotely captured image.

6. The system of claim 3, wherein the light pattern comprises at least one of a series of pulses, a design, or a cycle of a range of wavelengths.

7. The system of claim 3, wherein the pointer device is integrated within the barcode reader.

8. The system of claim 3, wherein the pointer device is a standalone device that is separate from the barcode reader.

9. The system of claim 8, wherein the pointer device and the barcode reader are configured to establish a wireless communication link for communication therebetween.

10. The system of claim 9, wherein the wireless communication link established between the barcode reader and the remote image capturing system is based on a Wi-Fi protocol, and the wireless communication link established between the barcode reader and the pointer device is based on a Bluetooth protocol.

11. The system of claim 9, wherein the pointer device is configured to transmit information to the barcode reader, the information indicative of the light pattern being emitted.

12. A method for a decoding remote barcodes, comprising:
   initializing a barcode reader;
   establishing a wireless communication link between the barcode reader and a remote image capturing system;
   receiving remotely captured images by the barcode reader from the remote image capturing system;
   transmitting commands from the barcode reader to the remote image capturing system via the wireless communication link, wherein the commands include instructions that cause the remote image capturing system to change its position and/or an imaging property responsive to inputs by a user via physical buttons and/or interface elements of the barcode reader while the remotely captured images are being displayed by the barcode reader; and decoding, via the barcode reader, a barcode included in an image transmitted by the remote image capturing system to the barcode reader.

13. A method for a decoding remote barcodes, comprising:

initializing a barcode reader;

establishing a wireless communication link between the barcode reader and a remote image capturing system;

receiving remotely captured images by the barcode reader from the remote image capturing system;

transmitting commands from the barcode reader to the remote image capturing system via the wireless communication link;

decoding, via the barcode reader, a barcode included in an image transmitted by the remote image capturing system to the barcode reader;

transmitting a pattern emitted by a pointer device to within a field of view of the remote image capturing system; and changing the field of view of the remote image capturing system in response to detecting the pattern.

14. The method of claim 13, wherein decoding the barcode is triggered in response to the barcode reader detecting the pattern within the remotely captured image.

15. The method of claim 13, wherein detecting the pattern includes identifying a range of RGB pixel values representative of a wavelength of the pattern.

16. The method of claim 15, wherein changing the field of view of the remote image capturing system includes repositioning the remote image capturing system from a wide field of view to have a narrower field of view centered around pixels exhibiting the RGB pixel values representative of a wavelength of the pattern.

17. The method of claim 13, further comprising:
pairing the pointer device with the barcode reader; and
transmitting identification information of the pattern from the pointer device to the barcode reader.

18. The method of claim 17, wherein decoding is responsive to the pattern being determined to be within an image captured by the remote image capturing system.

19. The method of claim 13, further comprising:
pairing the pointer device with the barcode reader; and
pairing the remote image capturing system with the barcode reader, wherein a pairing mode facilitating a link between the barcode reader and the remote image capturing system is the same as a pairing mode that facilitated a link between the pointer device and the barcode reader.

20. Non-transitory storage media including computer readable instructions that, when executed by one or more processors, cause a system including the one or more processors to perform a method comprising:

establishing a wireless communication link between a barcode reader and a remote image capturing system;

transmitting commands from a barcode reader to the remote image capturing system via the wireless communication link, wherein the commands include instructions that cause the remote image capturing system to tilt, rotate, or move responsive to a user of the barcode reader making corresponding movements to the position of the barcode reader as detected by a signal output from a sensor barcode reader;

receiving one or more images at the barcode reader from the remote image capturing system via the wireless communication link; and decoding a barcode with a decoder stored in the non-transitory storage media of the barcode reader.

* * * * *